Dec. 28, 1954  T. PRIMICH  2,698,031
PROGRESSIVE LOCK SEAM FOR SHEET METAL PIPES
Filed March 24, 1953  2 Sheets-Sheet 1
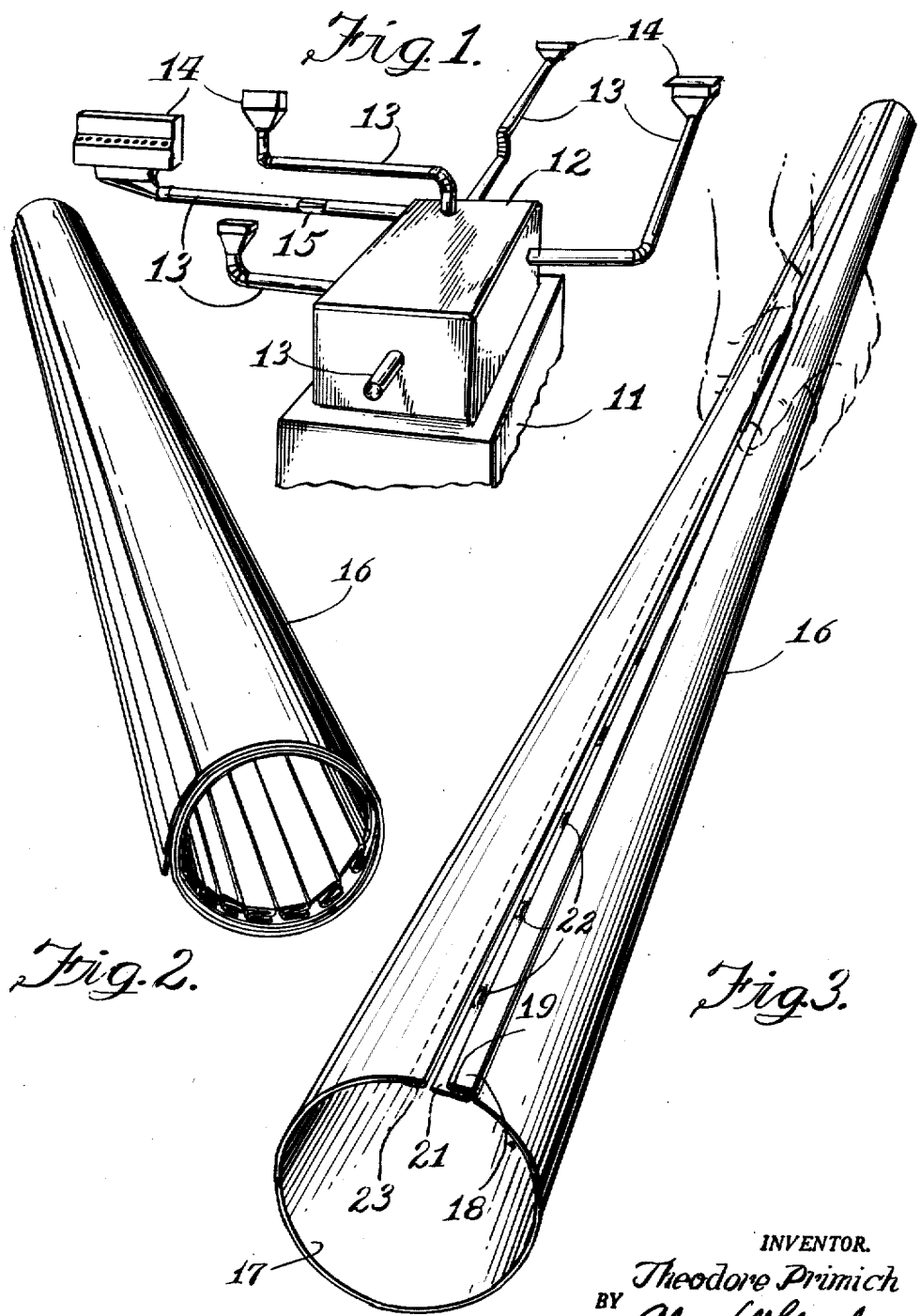
INVENTOR.
Theodore Primich
BY Alois W. Graf
Attorney

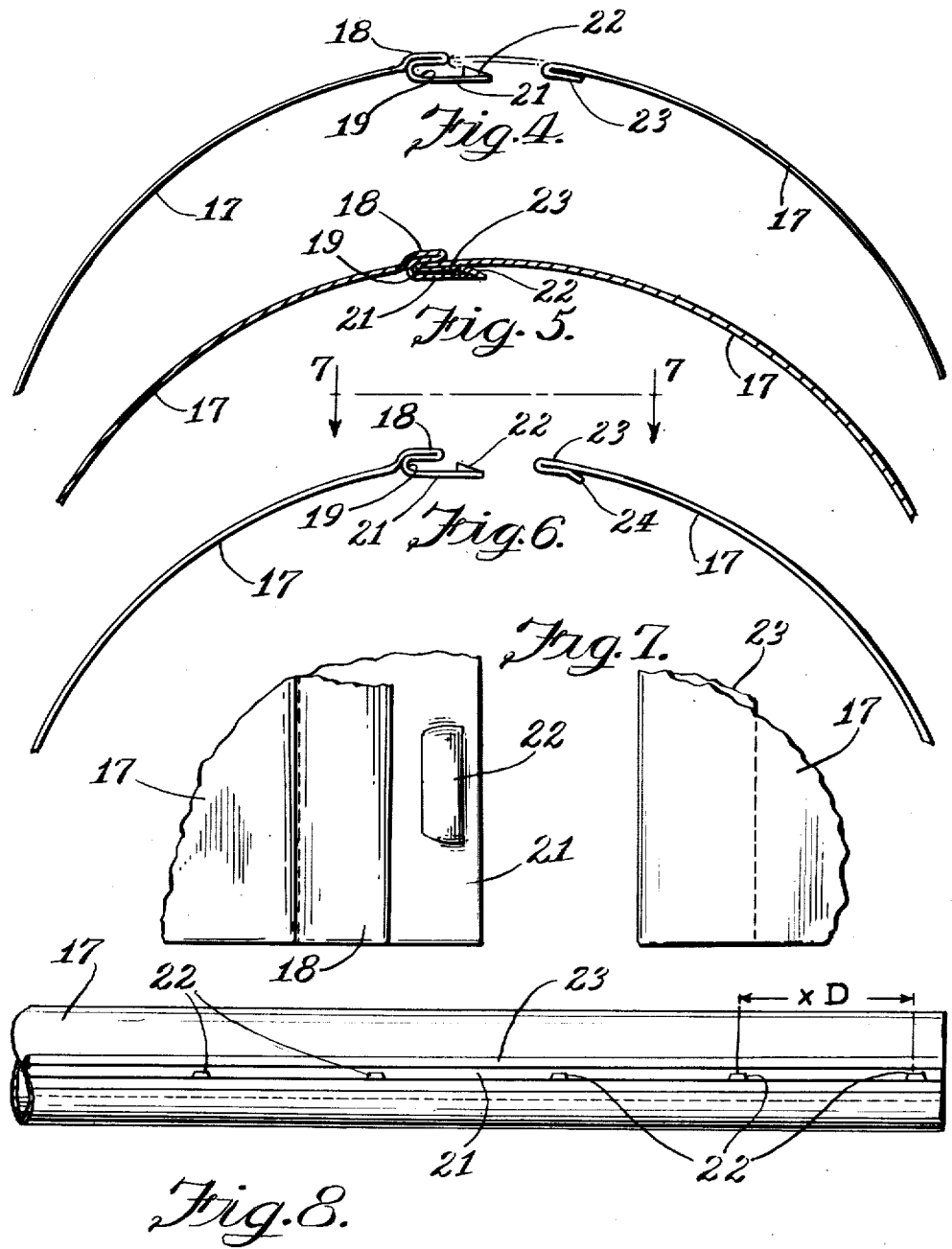

United States Patent Office 2,698,031
Patented Dec. 28, 1954

2,698,031

PROGRESSIVE LOCK SEAM FOR SHEET METAL PIPES

Theodore Primich, Gary, Ind.

Application February 24, 1953, Serial No. 338,362

4 Claims. (Cl. 138—74)

The present invention relates to a lock seam for sheet metal pipes for heating and ventilating systems, and more particularly to a progressive lock seam for long sheet metal pipe.

In warm air heating systems it is becoming customary to have a heating unit provided with a plenum which is connected by a plurality of relatively small diameter sheet metal pipes to suitably positioned outlets or register elements. Such pipes range in size from four to five inches diameter. It has been found that the relatively short lengths of pipe, which heretofore were only several feet in length, usually were crimped for interconnection. This crimping produces a turbulence which reduces the flow of air through the pipe conduit as much as twenty-five percent. To minimize the number of crimped joints it has been suggested to use longer length pipes, and also to eliminate the crimped joints.

More recently small diameter pipe has been supplied for heating installations in ten foot lengths. Such pipes have been joined at the factory, and it is apparent that the bulk of such pipes is very appreciable, and hence presents problems in delivery of the pipe to the place of installation. It had been proposed to employ a lock seam such as those shown in the prior art as exemplified by the patents to Siebenlist No. 2,201,409 and Sladky No. 1,900,749. With such lock joints it would be possible to ship the pipe in nested form and assemble the pipe on location. An attempt to employ this practice, however, disclosed some unexpected problems. It was found to be difficult for one man to assemble a ten foot length of pipe. Where several men were employed a greater degree of success was possible, but it was found that the sharp edges of such pipe joints produced minor injuries to the workmen. Where a pipe connector was used to interconnect sections of the pipe comprising a band overlapping each of the pipe sections by several inches the installation was reasonably successful. Where, however, some workmen endeavored to employ the old style crimped end it was found that the long seam frequently would open, and hence the conduit was not air tight. Various attempts to modify the prior art constructions for lock joints encountered extreme manufacturing difficulties, and hence such attempts had to be discarded. It, therefore, is apparent that it would be desirable to provide an improved lock seam for long pipes, particularly those of the smaller diameter. In accordance with the present invention it was possible to provide the desired improvement by the use of a progressive lock seam, whereby the assembly of the pipe could be begun at one end, and a single workman could progressively move down toward the other end of the pipe and assemble it with assurance that the seam would remain together without some portion opening or becoming disengaged before he had arrived at the other end of the pipe.

It is, therefore, an object of the present invention to provide an improved progressive lock seam for long sheet metal pipe sections.

It is a further object of the invention to provide an improved lock seam for long sheet metal pipe sections which may be shipped in nested manner.

A further object of the invention is to provide an improved progressive lock seam for long sheet metal pipe sections of relatively small diameter which is simple and economical to manufacture.

Still another object of the invention is to provide an improved progressive lock seam for long sheet metal pipe sections which is safe to handle and can be assembled without tools by a single individual workman.

Other and further objects of the present invention subsequently will become apparent by reference to the following description taken in conjunction with the accompanying drawings wherein:

Figure 1 is a perspective view of a heating installation employing pipe formed in accordance with the present invention;

Figure 2 is a perspective view showing the manner of nesting the pipe of the present invention for shipment;

Figure 3 is a perspective view showing the progressive manner of assembling the pipe sections;

Figure 4 is an end view of the progressive lock seam edge illustrating the manner of assembly of a pipe section;

Figure 5 is a cross-sectional view of the progressive lock seam edge when the pipe section is assembled;

Figure 6 is an end view of a modification of the progressive lock seam shown in Figure 4;

Figure 7 is a partial plan view showing details of the progressive lock seam of the present invention as seen in the direction of the arrows along the line 7—7 of Figure 6; and Figure 8 is a plan view of a portion of a pipe section embodying the present invention.

In Figure 1 there is shown the upper portion 11 of a heating plant or system having a plenum 12 connected by a plurality of small diameter pipes 13 to suitable outlets or registers 14. The pipes 13 are formed of relatively long lengths such as ten foot lengths, and where several lengths are needed to provide the necessary conduit to a register they may be joined by a pipe connector 15 where butt connections are desired. Of course the pipes 13 can be provided with crimped ends as is customary.

By the provision of a unique pipe joint comprising the present invention it is possible to transport ten foot pipes in a nested package 16 as illustrated in Figure 2. Each of these sheet metal pipes of the bundle 16 may be assembled in the manner illustrated in Figure 3. By beginning at one end the male edge portion is fitted into the female edge portion until it snap locks into position. By means of the present progressive locking edge the assembler may continue to move from the far end of the pipe to the near end of the pipe shown in Figure 3 and progressively close the lock seam to form a complete pipe length.

The formation of the complete pipe length in Figure 3 is made possible by a construction having a shape such as that illustrated by the end view of Figure 4 and the cross-sectional view of Figure 5. From these views it will be noted that one edge of the sheet metal forming the pipe is folded over inwardly in contiguous relation to the inner surface of the pipe for a distance equal to the portion 18, whereupon the edge is refolded in spaced relation a distance equal to about twice the thickness of the sheet metal of the pipe. The longitudinal edge extends beyond the folded portion 18 a certain distance so as to provide a guide rest for the male edge. In addition to forming the guide rest sufficient material is provided in the portion 21 so that a plurality of inclined locking lugs may be struck up out of the portion 21. The male edge of the pipe 17 is folded over inwardly in contiguous relation to the inner surface of the pipe to form the member 23. The dotted line representation in Figure 4 shows the manner in which the portion of edge 23 is first positioned in substantial abutment to the edge portion 18 before it is depressed so as to be inserted into the space 19. When the portion 23 has been moved into the space 19 as far as it can go, the inner edge of the portion 23 is engaged by locking lug 22 as illustrated by the cross-sectional view of Figures 5.

Where for reasons related to the thickness of the material forming the pipe 17 and the diameter of the pipe it may be desired to assure the locking engagement of the lug 22, the folded over male edge 23 may have its edge 24 slightly spaced from the inner surface of the pipe 17 as illustrated by Figure 6. The advantage of this slight variation will, of course, be apparent to those skilled in the art.

Figure 7 in greater detail illustrates the construction common to Figures 4, 5 and 6, from which it will be seen that the locking lug 22 is struck upwardly from a portion of the material forming the guide edge 21. The formation of the guide edge 21 as illustrated greatly reduces the chances of injuring the workman in assembling the pipe since the workman's hands ordinarily would not engage a sharp edge of the pipe as may be appreciated from the assembling operation illustrated in Figure 3.

It has been found that the longitudinal spacing between the locking lugs 22 should bear a certain relation to the diameter of the pipe if the diameter is varied from a small four inch pipe to the larger pipe such as the twelve inch pipe. For a four inch pipe the distance between two adjacent lugs is at least equal to and preferably a little greater than the diameter of the pipe. Thus for a four inch pipe the lugs 22 might be spaced five or six inches apart so that for four and five inch pipes the intervals are of the order of the diameter of the pipe. For ten and twelve inch pipes the spacing should be approximately five or six inches so that for the largest pipe the spacing is of the order of one-half the diameter of the pipe. Thus a particular relation between the spacing of the lugs and the pipe diameter and the length of the pipe constitutes the parameter for a progressive lock seam which may be assembled in the manner taught by the present invention. Whereas previously great difficulty had been encountered in assembling the larger diameter pipe such as the ten and twelve inch pipe, the progressive assembly permitted by the present construction is easy and safe. The seam thus formed does not open at a subsequent time, and hence is permanent. For the smaller diameter pipe where manufacturing difficulties previously were encountered the present construction incurs no difficulty.

While for the purpose of illustrating and describing the present invention a preferred embodiment has been shown in the drawings, it is to be understood that the invention is not to be limited thereby since such variations are contemplated as may be commensurate with the spirit and scope of the invention set forth in the accompanying claims.

I claim as my invention:

1. A sheet metal pipe comprising a relatively narrow rectangular metal sheet having a longitudinal edge portion folded over inwardly in contiguous relation and a reversely folded portion in spaced relation to said folded over portion a distance equivalent to twice the thickness of the sheet metal member, said reversely folded portion having an edge extending beyond the folded edge of the first folded over portion to serve as a guide rest for the opposite edge portion of said sheet, a plurality of inclined locking lugs struck up from the plane of said reversely folded portion within said guide rest area, said lugs being arranged in linearly spaced intervals along the length thereof and each having an edge parallel to said first folded over edge portion, the other longitudinal edge portion of said sheet being folded over inwardly in contiguous relation at the fold to form a male member to fit within and substantially fill the space between the reversely folded portion to sequentially engage the lugs thereof whereby the pipe seam may be connected together in a longitudinal progressive manner, the edge of said folded over male member presenting a continuous edge for sequential engagement by the edges of the lugs of said female member.

2. In a sheet metal pipe comprising a narrow long rectangular metal sheet having one longitudinal edge portion folded over inwardly in contiguous relation and reversely bent in spaced relation to said folded over portion a distance equivalent to twice the thickness of the sheet metal to form a female member, said edge portion extending beyond the edge of the first folded over portion to serve as a guide rest for the other longitudinal edge of said sheet, a plurality of outwardly inclined locking lugs integrally formed out of the spaced refolded extending guide rest portion and arranged in linearly spaced intervals, each of said lugs having an edge parallel to the first folded edge, the other longitudinal edge portion of said metal sheet being folded over inwardly in contiguous relation to form a continuous male member thereby to fit within said female member, the other longitudinal edge to be engaged sequentially by the edges of said locking lugs whereby the progressive seam may be connected together in a longitudinal progressive manner from one end of the pipe to the other end.

3. In a sheet metal pipe formed of a length at least three times its width, the metal sheet of a length at least three times its width, the combination comprising a longitudinal edge portion of said sheet folded over inwardly in contiguous relation to form a folded edge and reversely folded in spaced relation to said folded over portion a distance equivalent to twice the thickness of the sheet metal member and having a single thickness edge portion extending beyond the folded edge of the first folded over portion to serve as a guide rest for the other longitudinal edge portion, a plurality of inclined locking lugs struck up from the plane of said single thickness edge portion extending beyond said first folded edge, said lugs being arranged linearly at regular intervals along the entire guide rest portions, said lugs having edge portions aligned parallel to said folded edge and being spaced outwardly therefrom, the other longitudinal edge portion being folded over inwardly in contiguous relation at the fold to form a male member to fit within and substantially fill the space between the reversely folded portion, said latter edge portion being folded a transverse distance substantially equal to the distance from the edges of said lugs to the spaced fold of said first longitudinal edge portion so that the continuous edge portion thereof will be engaged at intervals by the edge portions of said lugs whereby the pipe seam may be connected together in a longitudinal progressive manner.

4. The combination in a sheet metal pipe comprising a narrow long rectangular metal sheet of a length at least three times its width having one longitudinal edge portion folded over inwardly in contiguous relation to the inner surface of the pipe and reversely folded in spaced relation to form a female portion having an edge portion extending beyond the edge of the first folded over portion to serve as a guide rest for the other longitudinal edge, a plurality of longitudinally spaced inclined locking lugs struck up from said guide rest portion extending beyond the fold of the edge of the first folded over portion, said lugs being inclined upwardly toward said refolded portion of said first member and having an edge parallel to said first folded over portion, the other longitudinal edge being folded over inwardly in contiguous relation to form a male portion to fit within and substantially fill the space between the reversely folded female portion, said male portion having the inner edge of the folded over portion inclined slightly away from the inner surface of the pipe to provide a biting engagement with the edges of the inclined locking lugs in sequence whereby the pipe seam may be connected together by one person in a longitudinal progressive manner from one end of the pipe to the other end.

References Cited in the file of this patent

UNITED STATES PATENTS

| Number | Name | Date |
|---|---|---|
| 1,297,591 | Prescott | Mar. 18, 1919 |
| 1,534,990 | Pritchard | Apr. 21, 1925 |
| 1,673,642 | Ruppelt | June 12, 1928 |
| 1,827,722 | Hayman | Oct. 13, 1931 |
| 1,900,749 | Sladky | Mar. 7, 1933 |
| 1,900,750 | Krantz | Mar. 7, 1933 |
| 1,907,536 | Goldberg et al. | May 9, 1933 |
| 2,038,389 | Siebenlist | Apr. 21, 1936 |
| 2,259,382 | Ingels | Oct. 14, 1941 |

UNITED STATES PATENT OFFICE
CERTIFICATE OF CORRECTION

Patent No. 2,698,031    December 28, 1954

Theodore Primich

It is certified that error appears in the above identified patent and that said Letters Patent are hereby corrected as shown below:

In the heading to the drawing, Sheets 1 and 2, line 3, for "March 24, 1953", each occurrence, read -- Feb. 24, 1953 --.

Signed and sealed this 22nd day of July 1969.

(SEAL)
Attest:

Edward M. Fletcher, Jr.    WILLIAM E. SCHUYLER, JR.
Attesting Officer    Commissioner of Patents